United States Patent
Miyake et al.

(10) Patent No.: US 7,204,499 B2
(45) Date of Patent: Apr. 17, 2007

(54) AXLE SUPPORTING STRUCTURE FOR INDUSTRIAL VEHICLE AND INDUSTRIAL VEHICLE HAVING THE SAME

(75) Inventors: Takahito Miyake, Kariya (JP); Hiroshi Kobayashi, Kariya (JP); Shuo Uematsu, Kariya (JP); Tomomichi Miura, Kariya (JP); Kenichi Katae, Kariya (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 478 days.

(21) Appl. No.: 10/827,726

(22) Filed: Apr. 20, 2004

(65) Prior Publication Data
US 2004/0217571 A1 Nov. 4, 2004

(30) Foreign Application Priority Data
Apr. 25, 2003 (JP) .......................... P2003-120911

(51) Int. Cl.
*B62D 49/08* (2006.01)

(52) U.S. Cl. .................. 280/124.111; 280/759

(58) Field of Classification Search ......... 280/124.111, 280/6.154, 759, 755, 757; *B62D 49/08*
See application file for complete search history.

(56) References Cited
U.S. PATENT DOCUMENTS 4,403,671 A * 9/1983 Schmahl ............... 180/53.7
4,471,975 A * 9/1984 Sorlie et al. ............ 280/759
6,398,242 B1 * 6/2002 Niwa et al. ......... 280/124.11

FOREIGN PATENT DOCUMENTS

| EP | 0909668 | 4/1999 |
|---|---|---|
| EP | 0965468 | 12/1999 |
| JP | 5-77617 | 3/1993 |
| JP | 10-81495 A * | 3/1998 |
| JP | 2000-016039 | 1/2000 |
| JP | 2003-11633 | 1/2003 |

* cited by examiner

*Primary Examiner*—Ruth Ilan
(74) *Attorney, Agent, or Firm*—Knoble Yoshida & Dunleavy, LLC

(57) ABSTRACT

An axle supporting structure for supporting an axle beam for an industrial vehicle includes a center pin, a pair of axle supporting units and a counterweight. The center pin protrudes from the axle beam. Each axle supporting unit has formed therethrough an insertion hole in which the center pin is inserted. The axle supporting unit has an upper axle supporting member and a lower axle supporting member which is detachably connected to the upper axle supporting member. The pair of axle supporting units is spaced from each other in a traveling direction of the vehicle. The center pin is rotatably supported between the pair of axle supporting units. The upper axle supporting members of the axle supporting units are cast in the counterweight.

11 Claims, 6 Drawing Sheets

AXLE SUPPORTING STRUCTURE FOR INDUSTRIAL VEHICLE AND INDUSTRIAL VEHICLE HAVING THE SAME

BACKGROUND OF THE INVENTION

The present invention relates to an axle supporting structure of an industrial vehicle which rotatably supports a center pin of an axle beam between a pair of axle supporting units which are spaced away from each other in a traveling direction of the industrial vehicle, and to the industrial vehicle having the same.

In a counterbalanced forklift truck, its rear axle beam is generally supported in such a manner that the beam is pivotable or swingable in a rolling plane about a center pin for improving the stability of the vehicle when traveling on the surface of a rough ground. The center pin of the rear axle beam is inserted through holes formed in a pair of axle supporting units which are spaced away from each other and located at the front and rear sides of the rear axle beam, thus being rotatably supported by the pair of axle supporting units.

The axle supporting units protrude downward from a rear frame that horizontally extends in the rear of the vehicle frame. Each axle supporting unit is constructed so as to be separable into an upper part and a lower part which cooperate to form a center pin insertion hole when the upper and lower parts are connected to each other. Specifically, each axle supporting unit includes an upper axle supporting member having formed therethrough an upper half of the center pin insertion hole and a lower axle supporting member having formed therethrough a lower half of the center pin insertion hole. The upper axle supporting member is joined to the rear frame by welding while the lower axle supporting member is detachably mounted to the upper axle supporting member by means of bolts or the like.

In order that the vehicle frame supports the rear axle beam, firstly the center pin of the rear axle beam is arranged in the semicircular hole of the upper half of the center pin insertion hole of the upper axle supporting member with the lower axle supporting member of the axle supporting unit detached from the upper axle supporting member. Then the lower axle supporting member is arranged so as to support the lower half of the center pin and fixed to the upper axle supporting member by a bolt. In each center pin insertion hole of the axle supporting units, a bushing is arranged to prevent metal touch between the axle supporting unit and the center pin.

Japanese Unexamined Patent Publication No. 2000-16039 discloses axle supporting unit of the above type. See page 2 and FIG. 1 of the reference. In the reference, however, each upper axle supporting member of the axle supporting units is joined to the rear frame by welding which is troublesome and costly.

Further, in the prior art wherein each upper axle supporting member of the axle supporting units is joined to the rear frame by welding, it is difficult to ensure that the paired center pin insertion holes are positioned in concentric relation to each other. In order to improve the concentricity of the center pin insertion holes of the welded upper axle supporting members, the bushing made of rubber is disposed in the center pin insertion hole. However, since rubber is relatively costly, the cost of the prior art axle supporting structure is increased.

Further, in the prior art structure disclosed in the above reference, the strength at the joints between the upper axle supporting members and the rear frame is not sufficient. That is, it is difficult to ensure a sufficiently high strength in the prior art axle supporting structure.

SUMMARY OF THE INVENTION

The present invention is directed to an axle supporting structure which achieves a relatively large strength at a low cost and which rotatably supports a center pin of an axle beam between a pair of axle supporting units, and to an industrial vehicle having the axle supporting structure.

In accordance with the present invention, an axle supporting structure for supporting an axle beam for an industrial vehicle includes a center pin, a first axle supporting unit, a second axle supporting unit and a counterweight. The center pin protrudes from the axle beam. The first axle supporting unit has formed therethrough a first insertion hole in which the center pin is inserted. The first axle supporting unit has a first upper axle supporting member and a first lower axle supporting member which is detachably connected to the first upper axle supporting member. The second axle supporting unit is spaced from the first axle supporting unit in a traveling direction of the vehicle. The second axle supporting unit has formed therethrough a second insertion hole in which the center pin is inserted. The center pin is rotatably supported between the first axle supporting unit and the second axle supporting unit. The second axle supporting unit has a second upper axle supporting member and a second lower axle supporting member which is detachably connected to the second upper axle supporting member. The first upper axle supporting member and the second upper axle supporting member are cast in the counterweight.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

An axle supporting structure for an industrial vehicle according to a preferred embodiment of the present invention will be now described with reference to FIGS. 1 though 4. The following description of the present preferred embodiment will be made by way of a forklift truck as an example of the industrial vehicle.

Figure 1:
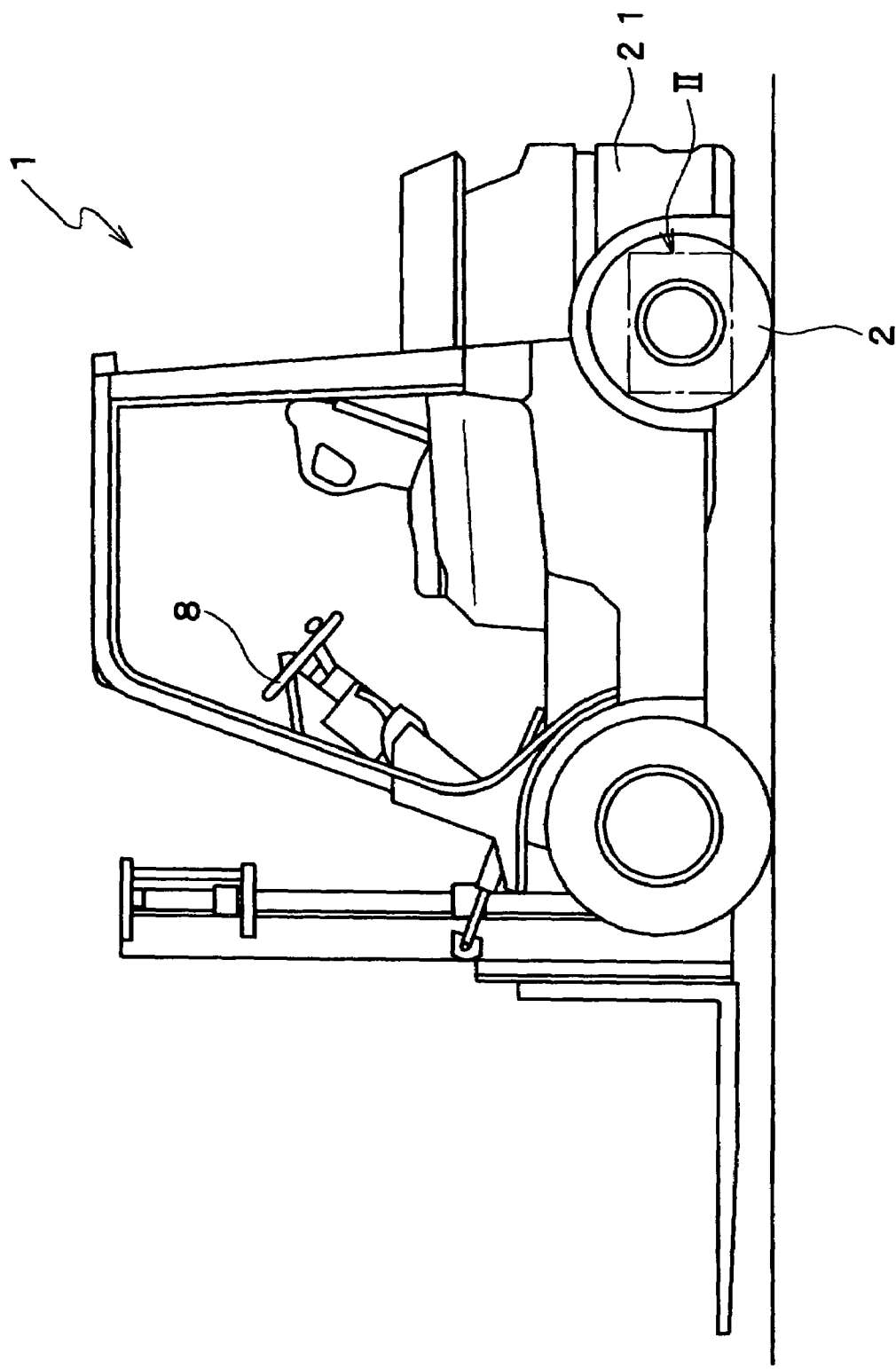
FIG. 1 is a side view illustrating a forklift truck according to a preferred embodiment of the present invention.
Figure 2:
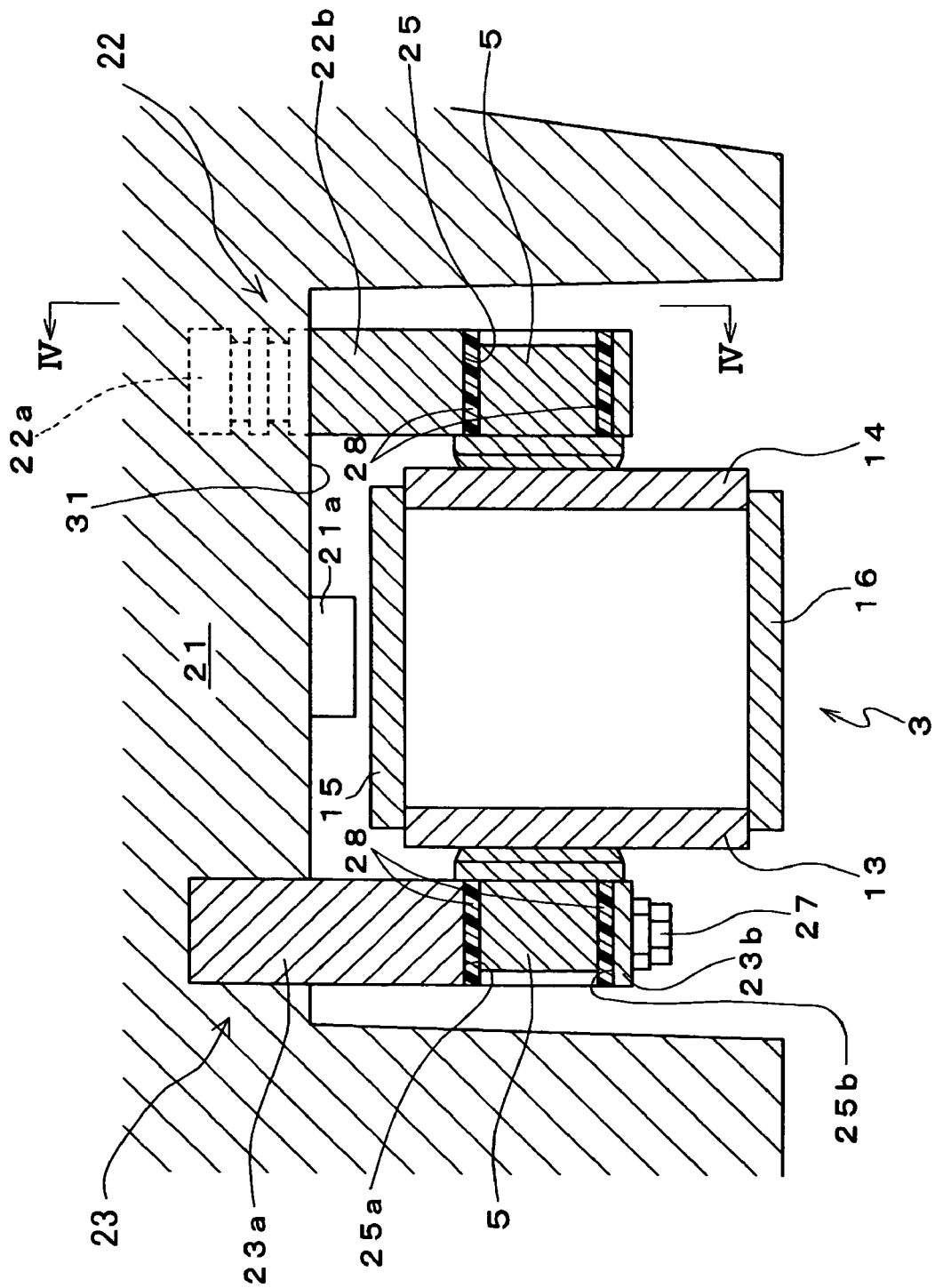
FIG. 2 is a partially enlarged sectional view illustrating cross-section of the rear axle beam at the center along the length thereof in the region II of FIG. 1 surrounded by a dash-dot line box.
Figure 3:
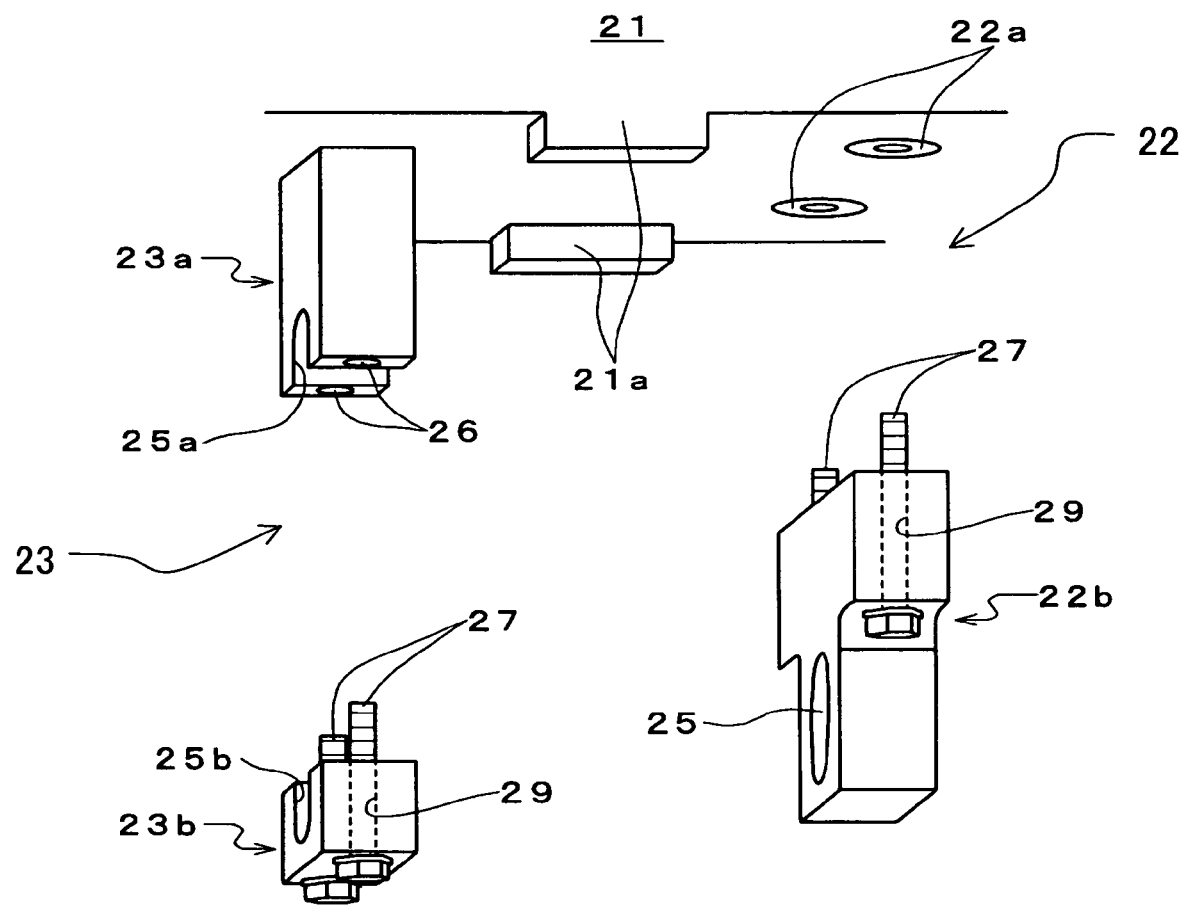
FIG. 3 is an exploded perspective view illustrating upper axle supporting members and lower axle supporting members, which are to be connected to each other, of a pair of axle supporting units of FIG. 2.

FIG. 1 is a side view illustrating a forklift truck 1 according to the preferred embodiment of the present invention. As show in FIG. 1, the forklift truck 1 includes a counterweight 21 in the rear of the vehicle. The counterweight 21 is made of a block of casting having an external shape adapted to form the rear part of vehicle and formed with recesses for accommodating therein rear axle wheels 2, a rear axle beam 3 which will be described in detail in later part hereof and axle supporting units which are shown in FIGS. 2 and 3. It is noted that FIG. 2 is a partially enlarged sectional view illustrating cross-section of the rear axle beam at the center along the length thereof in the region II of FIG. 1 surrounded by a dash-dot line box. It is also noted that FIG. 3 is an exploded perspective view illustrating upper axle supporting members and lower axle supporting members, which are to be connected to each other, of a pair of axle supporting units of FIG. 2.

Figure 4:
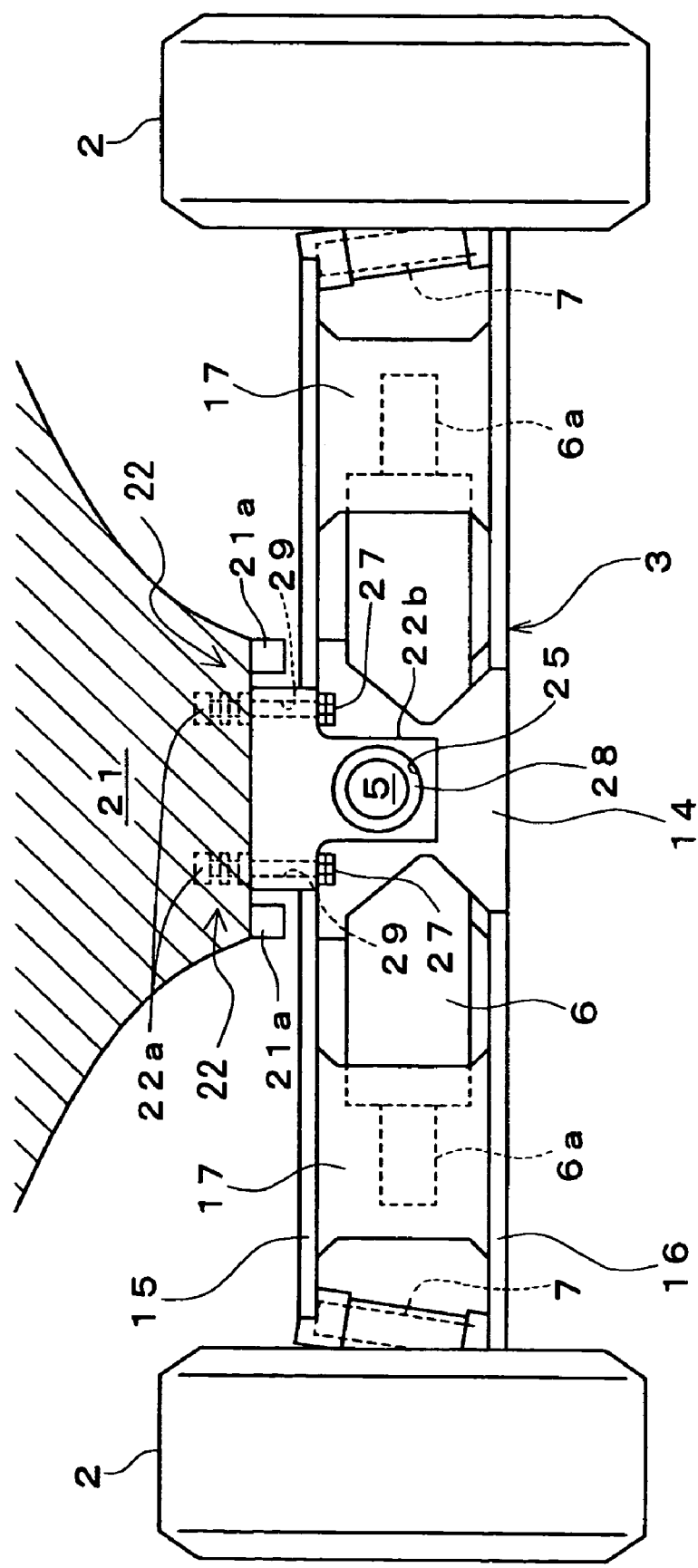
FIG. 4 is a partial cross sectional view as seen from the line IV—IV of FIG. 2.

FIG. 4 is a partial cross sectional view as seen from the line IV—IV of FIG. 2, illustrating the rear axle beam 3 and a pair of rear wheels 2 supported at the opposite ends of the rear axle beam. As shown in FIGS. 2 and 4, the rear axle beam 3 includes a plate-like upper axle beam member 15 and a plate-like lower axle beam member 16. The upper and lower axle beam members 15 and 16 are connected together at the middle in the longitudinal direction thereof by a front and rear vertical connecting plates 13 and 14 and adjacent to the ends thereof by vertical direction by vertical connecting plates 17, as best seen in FIG. 4. As shown in FIG. 2, the cross-section at the middle in the longitudinal direction of the rear axle beam 3 is of substantially a shape of square-frame.

Referring again to FIG. 4, the rear axle beam 3 of square-frame shape accommodates therein a steering cylinder 6. The rear wheels 2 are connected to piston rods 6a of the steering cylinder 6 through linkage (not shown), so as to pivot on kingpins 7, respectively. The rear wheels 2 are steered in the desired direction in response to the operation of the steering cylinder 6 which is in turn driven by a steering wheel 8, which is shown in FIG. 1, drives the steering cylinder 6.

As shown in FIG. 2, center pins 5 protrude from the front and rear connecting plates 13 and 14, respectively, at the middle of the rear axle beam 3 in the longitudinal direction thereof. Pivotal motion of the rear axle beam 3 about the center pins 5 permits the vehicle body to roll or rock from side to side with the rear wheels 2 kept in contact with the ground surface.

Now axle supporting units 22 and 23 which rotatably support the center pins 5 of the rear axle beam 3 will be described. As shown in FIG. 2, the axle supporting units 22 and 23 are disposed within a recess 31 formed in the counterweight 21 and provided in a pair including the first axle supporting unit 22 and the second axle supporting unit 23 which are spaced from each other along the width of the rear axle beam 3, that is, in the traveling direction of the vehicle. As shown in FIG. 3, each of the axle supporting units 22 and 23 is of splittable type such that each unit is divided or separable into upper and lower parts. In the present preferred embodiment, the first axle supporting unit 22 is arranged on the rear side of the rear axle beam 3, or on the right side as seen on FIGS. 2 and 3. The first axle supporting unit 22 has an upper axle supporting member in the form of nuts 22a formed in the counterweight 21 and a lower axle supporting member 22b having formed therethrough a circular hole 25 through which one of the center pins 5 is inserted. As shown in FIG. 4, the lower axle supporting member 22b is fixedly connected to the upper axle supporting member by screwing two bolts 27 into the nuts 22a. On the other hand, the second axle supporting unit 23 is arranged on the front side of the rear axle beam 3, or on the left side as viewed on FIGS. 2 and 3. The second axle supporting unit 23 has an upper axle supporting member 23a having formed on the lower surface thereof a semicircular hole 25a and a lower axle supporting member 23b having formed on the upper surface thereof a complementary semicircular hole 25b.

In the first axle supporting unit 22, the lower axle supporting member 22b is formed substantially in the shape of letter "T". The circular hole 25 is formed through the lower supporting member 22b at a position slightly lower than the middle of the lower axle supporting member 22b so as to receive therethrough the center pin 5. As shown in FIGS. 3 and 4, a pair of bolt holes 29 is formed through the crossbar of the letter "T" of the lower axle supporting member 22b on opposite sides of the circular hole 25 so as to extend in a vertical direction. It is noted that only one bolt hole 29 is illustrated by a dotted line in FIG. 3. In FIG. 2, the bolt holes 29 are formed on the further and reader's sides of the crossbar of the letter "T" of the lower axle supporting member 22b. Each bolt 27 is inserted into the corresponding bolt hole 29 and screwed into the corresponding nut 22a and, thereby to fix the lower axle supporting member 22b to the nuts 22a, that is, to the upper axle supporting member.

As shown in FIGS. 2 and 4, major part of the nuts 22a which receive therein the corresponding bolts 27 is cast in the counterweight 21. In the surface of the counterweight 21 which faces the lower axle supporting member 22b, only bolt insertion holes of the nuts 22a are exposed to the lower axle supporting member 22b. The nuts 22a, which are directly cast in the counterweight 21, serve as an upper axle supporting member.

In the second axle supporting unit 23, which is arranged on the front side of the rear axle beam 3, or on the left side as seen on FIGS. 2 and 3, the upper semicircular hole 25a and the lower semicircular hole 25b cooperate to form a complete circular hole similarly to the circular hole 25 of the lower axle supporting member 22b when the upper axle supporting member 23a and the lower axle supporting member 23b are combined together.

The upper axle supporting member 23a is directly cast with the counterweight 21 similarly to the above-described nuts 22a. The upper semicircular hole 25a is formed in the direction of insertion of the center pin 5 in the surface of the upper axle supporting member 23a which faces the lower axle supporting member 23b. As best shown in FIG. 2, nuts 26 are cast in the bottom surfaces of the upper axle supporting member 23a on opposite sides of the semicircular hole 25a for receiving therein threaded ends of bolts 27 for the lower axle supporting member 23b. The bolts 27 are inserted through the corresponding bolt holes 29 of the lower axle supporting member 23b and received by the corresponding nuts 26, respectively, thereby to fix the lower axle supporting member 23b to the upper axle supporting member 23a.

The lower semicircular hole 25b is formed in the direction of insertion of the center pin 5 in the surface of the lower axle supporting member 23b which faces the upper axle supporting member 23a. The pair of bolt holes 29 is formed through the lower axle supporting member 23b on opposite sides of the lower semicircular hole 25b, so as to extend in the vertical direction. It is noted that only one bolt hole 29 is illustrated by a dotted line in FIG. 3. Specifically, the pair of bolt holes 29 is formed respectively on the further and reader's sides of the lower axle supporting member 23b so as to sandwich the lower semicircular hole 25b as seen on FIG. 2. In FIG. 2, the bolt holes 29 are formed on the further and reader's sides of the lower axle supporting member 23b. Each bolt 27 is inserted into the corresponding bolt hole 29 and screwed into the corresponding nut 26, thereby to fix the lower axle supporting member 23b to the upper axle supporting member 23a.

In mounting the rear axle beam 3 to the vehicle frame (not shown), with the lower axle supporting member 23b of the second axle supporting unit 23 removed form its associated upper axle supporting member 23a, the lower axle supporting member 22b of the first axle supporting unit 22, having the circular hole 25 is fixed to the counterweight 21 by screwing the bolts 27 into the nuts 22a formed by casting in the counterweight 21. At this time, the lower axle supporting member 22b is positioned to the counterweight 21. That is, the bolts 27 and the nuts 22a are positioned to the bolt holes 29. Thus, the position in the front-and-rear direction of the lower axle supporting member 22b is adjusted. Also, the position in the right-and-left direction of the lower axle supporting member 22b is adjusted. Further, the position of the lower axle supporting member 22b is adjusted vertically by using appropriate spacers interposed between the lower axle supporting member 22b and the counterweight 21.

In such a state where the lower axle supporting member 22b of the first axle supporting unit 22 is fixed to the counterweight 21 by way of the bolts 27 screwed into the nuts 22a while the lower axle supporting member 23b of the second axle supporting unit 23 is detached from the upper axle supporting member 23a, one of the center pins 5 of the rear axle beam 3 is inserted into the circular hole 25 of the lower axle supporting member 22b of the first axle supporting unit 22 while the other center pin 5 is placed into the upper semicircular hole 25a of the upper axle supporting member 23a of the second axle supporting unit 23. Then the lower semicircular hole 25b of the lower axle supporting member 23b is engaged with the lower side of the center pin 5 and the bolts 27 are screwed into the nuts 26. Thus, the lower axle supporting member 23b is fixed to the upper axle supporting member 23a.

It is noted that as shown in FIGS. 2 and 4 cylindrical bushings 28 made of resin material are arranged respectively in the circular hole 25 of the lower axle supporting member 22b and the circular hole which is formed by the upper and lower semicircular holes 25a and 25b of the upper and lower axle supporting members 23a and 23b, respectively. That is, the center pins 5 of the rear axle beam 3 are inserted in the circular hole 25 and the circular hole, which is formed by the upper and lower semicircular holes 25a and 25b, through the bushings 28, respectively.

The counterweight 21 is formed at the bottom thereof with a pair of stops 21a projecting downward on opposite sides of the rear axle beam 3 in the longitudinal direction thereof as shown in FIG. 4, and at the middle in the direction of width of the rear axle beam 3 as shown in FIG. 2, for regulating the pivoting movement of the rear axle beam 3.

The present preferred embodiment has the following features.

As is apparent from the foregoing description, the forklift truck 1 of the preferred embodiment dispenses with the conventional welding of its rear axle beam support to the vehicle frame and, instead, the counterweight 21 is cast with the nuts 22a and the upper axle supporting member 23a as the upper support for the rear axle beam 3. Thus, the trouble associated with the welding of the upper support of the rear axle beam 3 to the vehicle rear frame is eliminated, therefore, the axle supporting units 22 and 23 are easily manufactured. In addition, since the welding cost is no more needed, the cost of the axle supporting structure according to the present preferred embodiment is reduced.

Further, the axle supporting structure of the present preferred embodiment is advantageous over the prior art in terms of the strength. In the prior art, since the rear frame and the upper axle supporting members of the axle supporting units are joined to each other by welding, the strength especially at the joints between the rear frame and the upper axle supporting members of the axle supporting units is questionable. In the present preferred embodiment, however, since the nuts 22a and the upper axle supporting member 23a, which serve as an upper axle supporting member, are directly cast in the counterweight 21, a relatively large strength is easily achieved.

Further, in the present preferred embodiment wherein the nuts 22a and the upper axle supporting member 23a of the first and second axle supporting units 22 and 23 are both directly cast in the counterweight 21, it is relatively easy to ensure the concentricity of a pair of opposed center pin insertion holes, that is, the circular hole 25 of the first axle supporting unit 22 and the circular hole formed by combination of the upper and lower semicircular holes 25a and 25b of the second axle supporting unit 23.

In the preferred embodiment, the first axle supporting unit 22 has the detachable lower axle supporting member 22b having formed therethrough the circular hole 25 for receiving therethrough the center pin 5. Depending on he manner in which the bolts 27 are screwed into the nuts 22a, the mounting position of the lower axle supporting member 22b, and hence the position of the circular hole 25, can be adjusted. Such adjustment makes it easier to achieve concentricity of the circular hole 25 and the circular hole which is formed by combination of the semicircular holes 25a and 25b of the first and second axle supporting units 22 and 23.

When the concentricity of the pair of circular holes is thus ensured, the bushings 28 arranged in the circular holes need not to be made of rubber material like prior art bushings, but the bushings 28 can be made of resin material which is less costly than rubber material. Thus, the cost of the axle supporting structure according to the present preferred embodiment is reduced.

The counterweight 21 is cast at positions to which the lower axle supporting member 22b is to be connected with the nuts 22a to receive therein the bolts 27 that serve as connecting members. Thus, the first axle supporting unit 22 has a smaller number of parts and hence easier to manufacture in comparison with the second axle supporting unit 23 in which the upper axle supporting member 23a having the nuts 26 filled in steel material is cast in the counterweight 21.

The present invention is not limited to the above-mentioned preferred embodiment, but may be modified within the scope of the appended claims.

Figure 5:
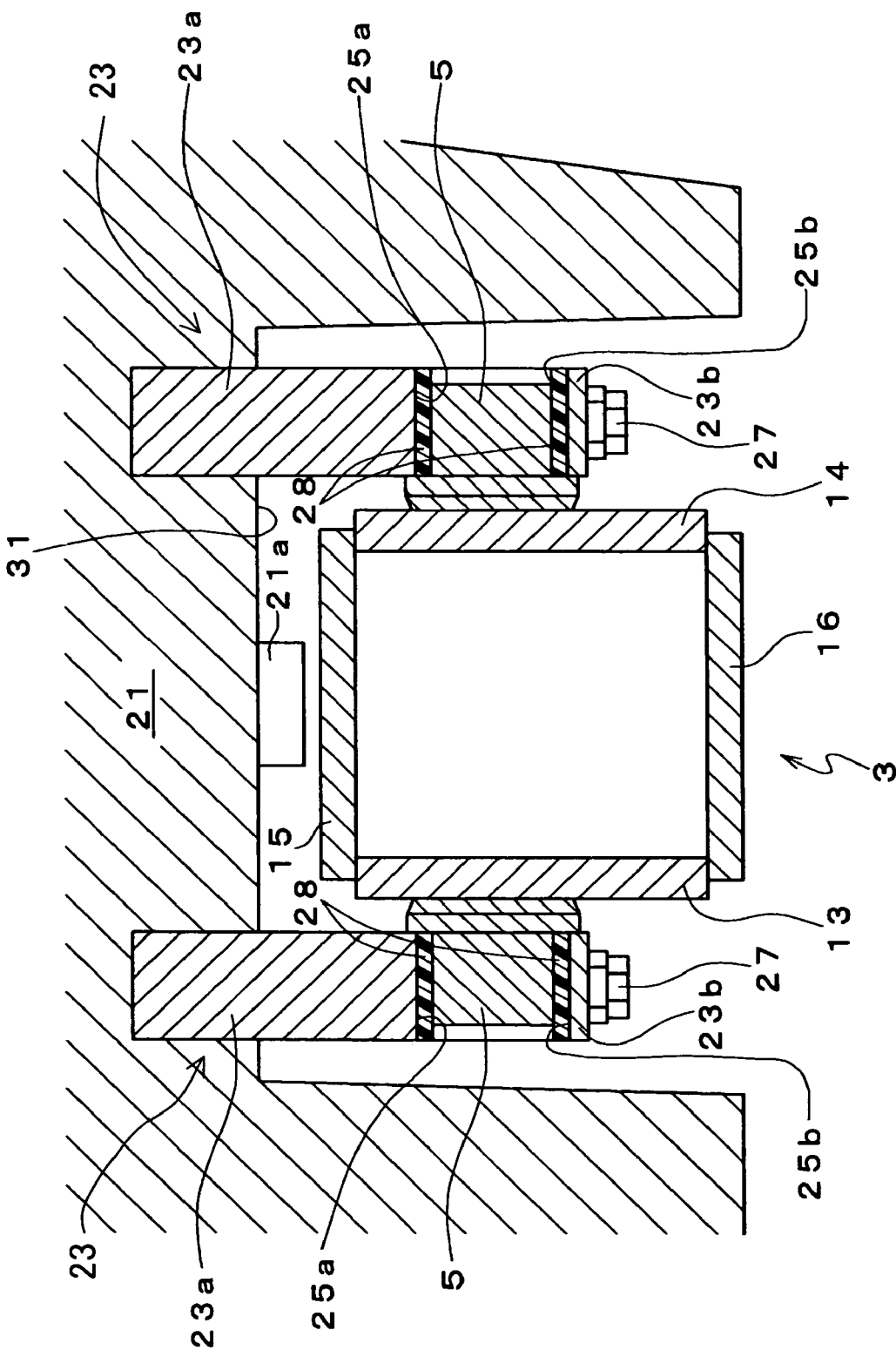
FIG. 5 is a partially enlarged sectional view corresponding to FIG. 2 of a forklift truck according to another preferred embodiment of the present invention.
Figure 6:
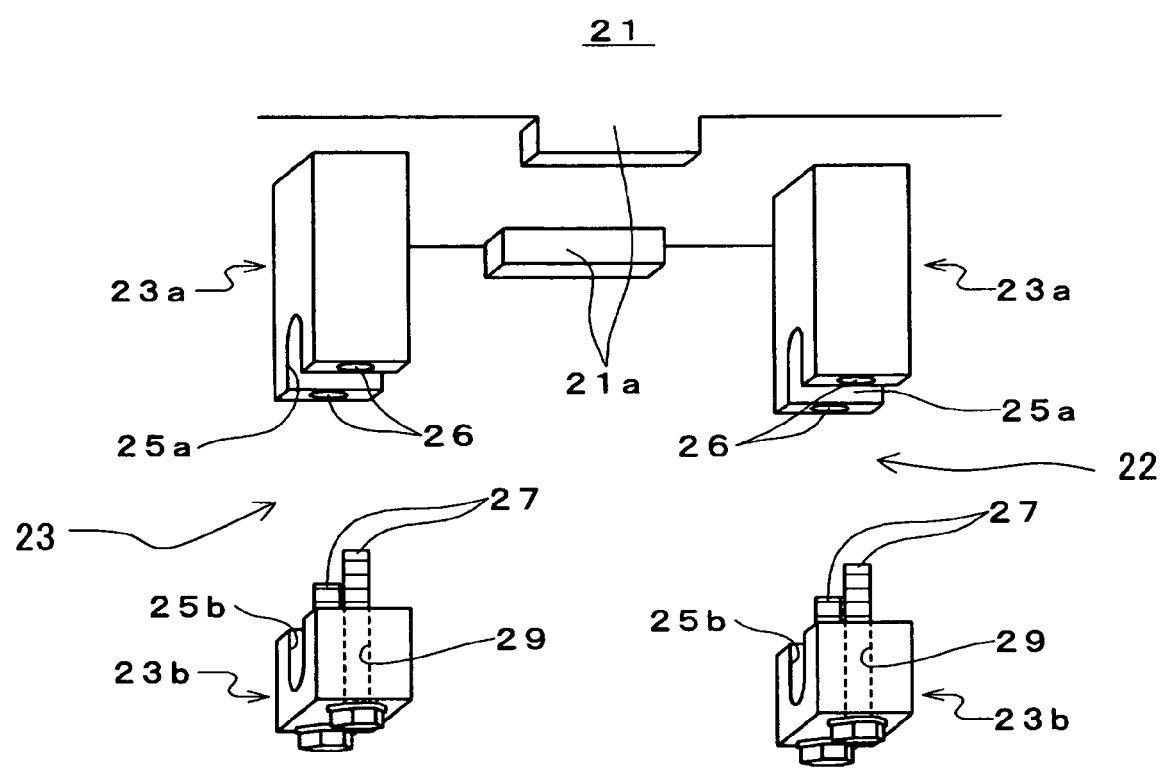
FIG. 6 is an exploded perspective view illustrating upper axle supporting members and lower axle supporting members of a pair of axle supporting units of FIG. 5 which are to be connected to each other.

In the aforementioned preferred embodiment, the first axle supporting unit 22 has the lower axle supporting member 22b having formed therethrough the circular hole 25 and the nuts 22a to which the lower axle supporting member 22b is connected, while the second axle supporting unit 23 has the combination of the upper axle supporting member 23a and the lower axle supporting member 23b having the upper semicircular hole 25a and the lower semicircular hole 25b formed therethrough, respectively. An alternative embodiment shown in FIGS. 5 and 6 differs from the preferred embodiment in that both of the paired axle supporting units 22 and 23 include the combination of the upper and lower axle supporting members 23a and 23b. In another alternative embodiment to the preferred embodiment, both of the paired axle supporting units 22 and 23 may include the combination of the nuts 22a and the lower axle supporting member 22b shown in FIGS. 2 and 3. In view of simultaneously ensuring the strength of the axle supporting units and the concentricity of a pair of the opposed circular holes, however, the aforementioned preferred embodiment is the most preferable.

In alternative embodiments to the embodiments, the nuts 22a cast in the counterweight 21 is replaced by steel material in which similar nuts are filled.

In the aforementioned embodiments, the bushings 28 are made of resin material. However, the bushings 28 are not limited to resin material, but they are made of rubber or metallic material. In order to reduce the cost of the axle supporting structure, however, the bushing made of resin material is the most preferable.

In alternative embodiments to the embodiments, each bushing 28 does not have to be of a cylindrical shape, but is divided into two parts each having a shape of a half cylinder.

In the aforementioned embodiments, each axle supporting unit is constructed so as to be divided into upper and lower separate parts. Specifically, each axle supporting unit has an upper axle supporting member and a lower axle supporting member which are fixed together by means of bolts 27. In alternative embodiments to the embodiments, the upper axle supporting member and the corresponding lower axle supporting member are fixed to each other by various means other than the bolts 27.

The shape of the lower axle supporting member 22b and 23b of the first and second axle supporting units 22 and 23 is not limited to a block. In alternative embodiments to the embodiments, each of the lower axle supporting members 22b and 23b is formed by a metallic plate which is curved so as to conform with and support the lower side of the center pin 5.

In the aforementioned embodiments, the axle supporting structure for the rear axle beam 3 has been described. In alternative embodiments to the embodiments, the axle supporting structure of the present invention is applied to a front axle beam which is supported so as to permit swinging in a rolling plane around the center pin 5.

The application of the axle supporting structure of the present invention is not limited to the forklift truck 1. As long as the industrial vehicle is of a center pin type wherein the axle beam is swingably supported, the axle supporting structure of the present invention is applied to vehicles such as a tractor shovel and a shovel loader.

Therefore, the present examples and embodiments are to be considered as illustrative and not restrictive and the invention is not to be limited to the details given herein but may be modified within the scope of the appended claims.

What is claimed is:

1. An axle supporting structure for supporting an axle beam for an industrial vehicle comprising:
a center pin protruding from the axle beam;
a first axle supporting unit having formed therethrough a first insertion hole in which the center pin is inserted, the first axle supporting unit having a first upper axle supporting member and a first lower axle supporting member which is detachably connected to the first upper axle supporting member, the first insertion hole being formed in the first lower axle supporting member, the first lower axle supporting member being formed substantially in the shape of the letter "T";
a second axle supporting unit spaced from the first axle supporting unit in a traveling direction of the vehicle, the second axle supporting unit having formed therethrough a second insertion hole in which the center pin is inserted, the center pin being rotatably supported between the first axle supporting unit and the second axle supporting unit, the second axle supporting unit having a second upper axle supporting member and a second lower axle supporting member which is detachably connected to the second upper axle supporting member; and
a counterweight in which the first upper axle supporting member and the second upper axle supporting member are cast.

2. The axle supporting structure according to claim 1, further comprising a connecting member for connecting the first lower axle supporting member to the first upper axle supporting member, which receives the connecting member.

3. The axle supporting structure according to claim 2, wherein the connecting member is a bolt.

4. The axle supporting structure according to claim 1, wherein the second upper axle supporting member and the second lower axle supporting member cooperate to form the second insertion hole.

5. The axle supporting structure according to claim 1, further comprising a bushing made of resin, the center pin being inserted in the first insertion hole through the bushing.

6. The axle supporting structure according to claim 1, further comprising a bushing made of one of rubber and metallic material, the center pin being inserted in the first insertion hole through the bushing.

7. An industrial vehicle comprising:
an axle beam;
a center pin protruding from the axle beam;
a first axle supporting unit having formed therethrough a first insertion hole in which the center pin is inserted, the first axle supporting unit having a first upper axle supporting member and a first lower axle supporting member which is detachably connected to the first upper axle supporting member, the first insertion hole being formed only in the first lower axle supporting member;
a second axle supporting unit spaced from the first axle supporting unit in a traveling direction of the vehicle, the second axle supporting unit having formed therethrough a second insertion hole in which the center pin is inserted, the center pin being rotatably supported between the first axle supporting unit and the second axle supporting unit, the second axle supporting unit having a second upper axle supporting member and a second lower axle supporting member which is detachably connected to the second upper axle supporting member; and
a counterweight in which the first upper axle supporting member and the second upper axle supporting member are cast.

8. The industrial vehicle according to claim 7, further comprising a connecting member for connecting the first lower axle supporting member to the first upper axle supporting member, which receives the connecting member.

9. The industrial vehicle according to claim 7, wherein the second upper axle supporting member and the second lower axle supporting member cooperate to form the second insertion hole.

10. The industrial vehicle according to claim 7, wherein the axle beam is a rear axle beam.

11. The industrial vehicle according to claim 7, further comprising a bushing made of resin, the center pin being inserted in the first insertion hole through the bushing.

* * * * *